(12) United States Patent  
Gilmore et al.

(10) Patent No.: US 7,616,728 B2  
(45) Date of Patent: Nov. 10, 2009

(54) NUCLEAR REACTOR INTERNALS ALIGNMENT CONFIGURATION

(75) Inventors: Charles B. Gilmore, Greensburg, PA (US); Norman R. Singleton, Murrysville, PA (US)

(73) Assignee: Westinghouse Electric Co. LLC, Cranberry Township, PA (US)

( * ) Notice: Subject to any disclaimer, the term of this patent is extended or adjusted under 35 U.S.C. 154(b) by 0 days.

(21) Appl. No.: 11/844,614

(22) Filed: Aug. 24, 2007

(65) Prior Publication Data

US 2009/0052606 A1 Feb. 26, 2009

(51) Int. Cl.
| | |
|---|---|
| G21C 1/04 | (2006.01) |
| G21C 23/00 | (2006.01) |
| G21C 9/00 | (2006.01) |
| B65G 21/20 | (2006.01) |
| F16D 1/06 | (2006.01) |

(52) U.S. Cl. .................. 376/347; 376/287; 376/289; 376/340; 403/306; 403/362

(58) Field of Classification Search ............. None
See application file for complete search history.

(56) References Cited

U.S. PATENT DOCUMENTS

| 3,192,120 | A | * | 6/1965 | Campbell | ............. 376/362 |
| 4,409,179 | A | * | 10/1983 | Burger | ............. 376/302 |
| 4,752,441 | A | * | 6/1988 | Gillett et al. | ............. 376/399 |
| 4,768,582 | A | * | 9/1988 | Wepfer | ............. 165/82 |
| 4,966,747 | A | * | 10/1990 | Tower et al. | ............. 376/254 |
| 5,268,948 | A | * | 12/1993 | Church et al. | ............. 376/446 |
| 5,864,594 | A | | 1/1999 | Balog et al. | |

* cited by examiner

*Primary Examiner*—Rick Palabrica
*Assistant Examiner*—Erin M Boyd

(57) ABSTRACT

An alignment system that employs jacking block assemblies and alignment posts around the periphery of the top plate of a nuclear reactor lower internals core shroud to align an upper core plate with the lower internals and the core shroud with the core barrel. The distal ends of the alignment posts are chamfered and are closely received within notches machined in the upper core plate at spaced locations around the outer circumference of the upper core plate. The jacking block assemblies are used to center the core shroud in the core barrel and the alignment posts assure the proper orientation of the upper core plate. The alignment posts may alternately be formed in the upper core plate and the notches may be formed in top plate.

17 Claims, 10 Drawing Sheets

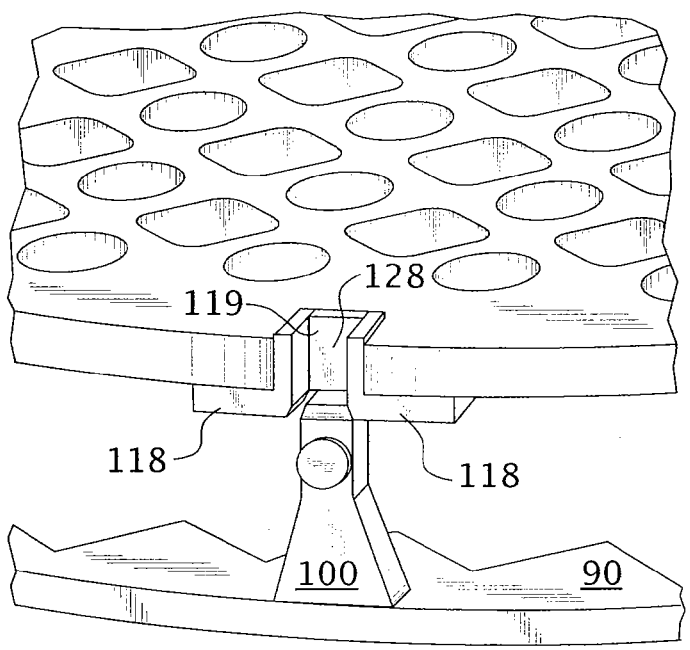
FIG. 10
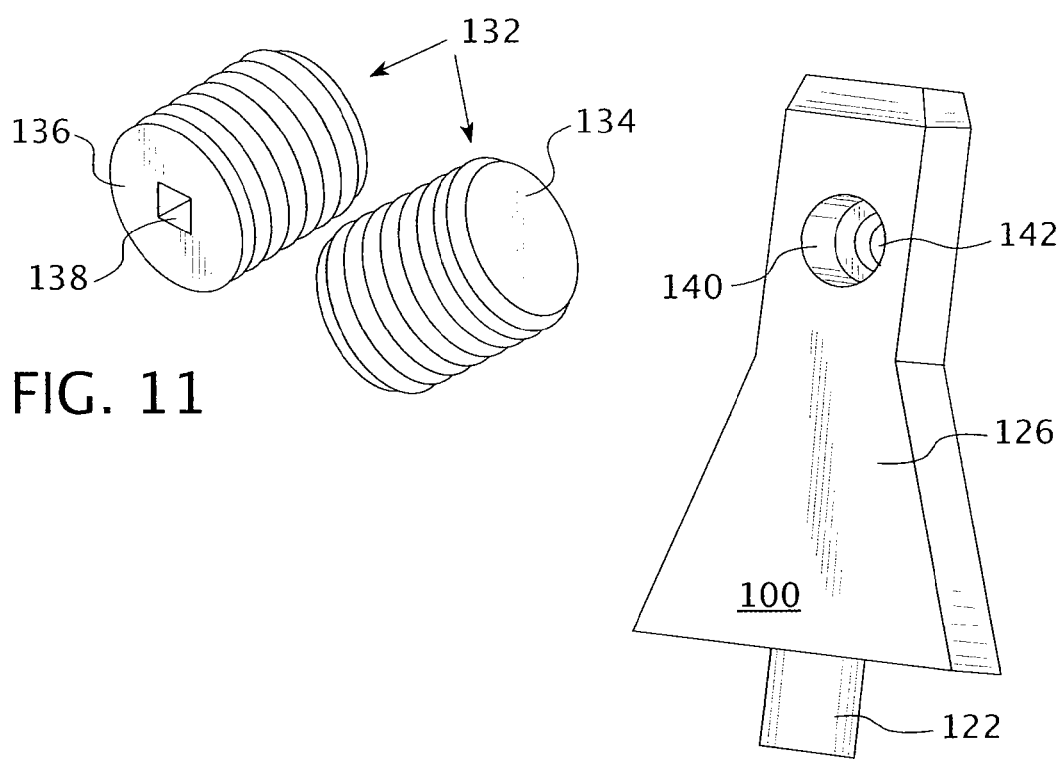
FIG. 11
FIG. 12

US 7,616,728 B2

1

NUCLEAR REACTOR INTERNALS ALIGNMENT CONFIGURATION

GOVERNMENT INTEREST

This invention was made with government support under Contract No. DE-FC07-05ID14636 awarded by the Department of Energy. The government has certain rights in this invention.

BACKGROUND OF THE INVENTION

1. Field of the Invention

The present invention relates generally to nuclear reactor internals and more specifically to apparatus for maintaining the alignment of the nuclear reactor internals.

2. Description of the Prior Art

The primary side of nuclear reactor power generating systems which are cooled with water under pressure comprises a closed circuit which is isolated from and in heat-exchange relationship with a secondary side for the production of useful energy. The primary side comprises the reactor vessel enclosing a core internals structure that supports a plurality of fuel assemblies containing fissile material, the primary circuit within heat exchange steam generators, the inner volume of a pressurizer, pumps and pipes for circulating pressurized water; the pipes connecting each of the steam generators and pumps to the reactor vessel independently. Each of the parts of the primary side comprising a steam generator, a pump and a system of pipes which are connected to the vessel form a loop of the primary side. The primary side is also connected to auxiliary circuits, including a circuit for volumetric and chemical monitoring of the pressurized water. The auxiliary circuit, which is arranged branching from the primary circuit, makes it possible to maintain the quantity of water in the primary circuit by replenishing, when required, with measured quantities of water, and to monitor the chemical properties of the coolant water, particularly its content of boric acid, which is important to the operation of the reactor.

The average temperature of the core components during full power reactor operation is approximately 580 F (304° C.). Periodically, it is necessary to shut down the reactor system for maintenance and to gain access to the interior side of the pressure vessel. During such an outage, the internal components of the pressure vessel can cool to a temperature of approximately 50° F. (10° C.). The internal components of the pressure vessel typically consist of upper and lower internals. The upper internals include a control rod guide tube assembly, support columns, conduits for instrumentation which enter the reactor vessel through the closure head, and a fuel assembly alignment structure, referred to as the upper core plate. The lower internals include a core support structure referred to as the core barrel, a core shroud that sits inside the core barrel and converts the circular interior of the barrel to a stepped pattern that substantially corresponds to the perimeter profile of the fuel assemblies that constitute the core supported between a lower core support plate and the upper core plate. As an alternate to the shroud, a bolted baffle former structure consisting of machined horizontal former and vertical baffle plates, has been employed. It is particularly important to maintain a tight alignment of the reactor internals upper core plate and a top plate of the shroud with the control rod drive mechanisms to assure that the control rods can properly scram; i.e., drop into the core, when necessary. This is particularly challenging when one considers the thermal expansion and contraction that has to be accommodated through power ramp-up and cool down sequences, where temperatures can vary between 50° F. (10° C.) and 580° F. (304° C.)

In conventional designs, lateral alignment of the upper internals components was accomplished with a series of single pins located around the circumference of the core barrel. The upper core plate alignment pins fit in notches in the upper core plate and locate the upper core plate laterally with respect to the lower internals assembly. The pins must laterally support the upper core plate so that the plate is free to expand radially and move axially during differential thermal expansions between the upper internals and the core barrel. FIG. 1 is a simplified cross-section of such a conventional reactor design. A pressure vessel (10) is shown enclosing a core barrel (32) with a thermal shield (15) interposed in between. Some plants have neutron pads in lieu of the thermal shield. The core barrel (32) surrounds the core (14) which is held in position by an upper core plate (40). The upper core plate (40) is aligned by the alignment pins (19) which extend through the core barrel (32) into notches (21) in the upper core plate (40). The notches (21) permit the core barrel to grow with thermal expansion at a greater rate than the upper core plate (40) during start up without compromising the lateral position of the upper core plate (40). The installation sequence of the core shroud (17) in new advanced passive plant designs requires a modified design that will prevent lateral movement of the upper core plate and the core shroud while enabling thermal growth and differential expansion between both the shroud and the upper core plate and the core barrel, while maintaining rotational stability.

New passive nuclear plant designs employ a core shroud assembly that is primarily a welded structure. The typical manufacturing process is to assemble the core shroud fully outside the lower internals core barrel. After assembly, the core shroud assembly is lowered into the lower internals. In this arrangement, it is not possible to have protruding alignment pins (19) to engage the upper internal's core plate. The protruding alignment pins would interfere with the core shroud bottom plate, core shroud panel reinforcements, etc., during insertion within the core barrel. Therefore, an alternate alignment feature was identified to accommodate the advanced passive plant internals design.

To align the core shroud and upper internals this alternate alignment feature comprises four alignment plates, secured to the lower internals core barrel with a set of bolts and dowel pins. The alignment plates are installed after installation of the core shroud assembly within the lower internals. Custom fit inserts are used to align both the lower and upper internals with each other via the alignment plates. However, the installation of the alignment plates involves machining four slots, or grooves, in the inside diameter of the core barrel; one groove is required for each alignment plate. The grooves are required to verify set up of the alignment plates prior to installation of the core shroud assembly. The alignment plates are installed in the lower internals after installation of the core shroud assembly. To provide clearance to slide the alignment plate into the machined groove in the core barrel inside diameter, the core shroud top plate slot depth is increased 0.750" (1.905 centimeters), as compared to nominal value. This 0.750" (1.905 centimeter) increase occurs at a location adjacent to one of the more limiting core shroud top plate ligaments. After securing each alignment plate with dowel pins and six bolts, the 0.750" (1.905 centimeter) gap between the alignment plate and the core shroud top plate is filled by installation of a customized insert. In view of the installation sequence for installing the alignment plates, it's likely that it may be difficult to remove the core shroud assembly, should there be a need during the 60 year design life of the advance passive plant designs. Accordingly, an alternate design is desired that would further facilitate manufacture, installation and removal of the core internals while maintaining rotational alignment between the core shroud and the upper core plate.

It is an object of this invention to provide such a further improvement that will additionally facilitate manufacture, satisfy the alignment requirements and permit later removal of the core shroud assembly in tact.

SUMMARY OF THE INVENTION

In addition to providing features to assure that the upper internals of the reactor vessel are aligned with lower internals during installation, desirably the design of the reactor internals should also include features that facilitate the removal of both lower and upper internals without extensive field operations. This invention presents a design that both aligns the upper core plate with the core shroud and does not require hardware removal when preparing the core shroud for removal from the lower internals. The basic alignment features of this invention comprise a plurality of jacking blocks peripherally spaced around the top plate of the core shroud; jacking studs radially outwardly extending from the jacking blocks; and alignment posts vertically extending and peripherally spaced around the top plate of the core shroud spaced from the jacking blocks.

When assembled together each combination of a jacking block and a jacking stud form a jacking block assembly. The jacking block assemblies and alignment posts are installed on the top plate of the core shroud and secured with full penetration welds. Anywhere from eight to sixteen jacking block assemblies would be evenly distributed azimuthally around the core shroud centerline. Preferably, the number of jacking block assemblies would be between 12 and 16. Four alignment posts, 90 degrees apart, would be placed azimuthally around the core shroud centerline to engage openings in the upper core plate from the underside.

The main purpose of the jacking block assemblies is to center, or align, the core shroud top plate within the core barrel during final assembly at manufacturing. Alignment is made by adjusting the radial extension of the threaded jacking studs that extend radially outward from mating threaded openings in the jacking blocks. After final positioning, the threads of the jacking studs are preferably "staked" or "spot" welded to the jacking blocks to lock the studs into position. During reactor operation, the loads at the top of the core shroud would be carried radially via the jacking studs to the core barrel. A hard surface liner formed from a material such as stellite is preferably welded to the core barrel inner surface opposite the jacking studs to accommodate the relative movement of the studs and the core barrel due to the different rates of thermal expansion and contraction over the range of reactor operating temperatures.

During installation of the upper internals over the lower internals, chamfered lead-in surfaces on the alignment posts will assure proper alignment of the upper core plate inserts prior to engagement of upper core plate fuel guide pins with the fuel assembly top nozzles. Preferably radial guides or bumpers extend from the peripheral surface on the outside diameter of the upper core plate, that are spaced circumferentially to provide additional guidance for the upper core plate within the lower internals core barrel during installation. The thickness of these bumpers may also be customized so that the in-plane loading of the upper core plate during reactor operation can be transferred as a radial load to the core barrel.

Preferably, each alignment post has a radially outwardly extending bumper to provide a shared load path for in-plane upper core plate loads which are transferred to the core barrel. The bumper can be formed from an insert on the backside of the alignment post and the thickness would be determined from "as built" measurements of the mating hardware. Alternately, the bumper on the alignment post can be replaced or supplemented with a jacking stud similar to that provided on the jacking block assemblies. Desirably, the front end of the stud is rounded to engage the core barrel while the back end of the stud has a machined contour that can be engaged by an installation tool. The outside circumference of the alignment post stud is threaded to engage mating threads in the alignment post. After installation of the core shroud assembly, the jacking studs in the alignment posts can be adjusted to achieve the desired gap with the core barrel. A hole is provided in the backside of the alignment post for the installation tool to engage the jacking stud for adjustment. Preferably, a locking feature such as a locking cup or tack weld is used to secure the jacking stud in place.

BRIEF DESCRIPTION OF THE DRAWINGS

A further understanding of the invention can be gained from the following description of the preferred embodiments when read in conjunction with the accompanying drawings in which:

FIG. 10 is a perspective view of the upper core plate engaging an alignment post with inserts added on the sides and back of the upper core plate slot;

FIG. 11 is a perspective view of two threaded jacking studs for an alignment post showing a rounded front section and articulated rear section;

FIG. 12 is a perspective view of an alignment post modified for a threaded jacking stud;

DESCRIPTION OF THE PREFERRED EMBODIMENTS

Figure 1:
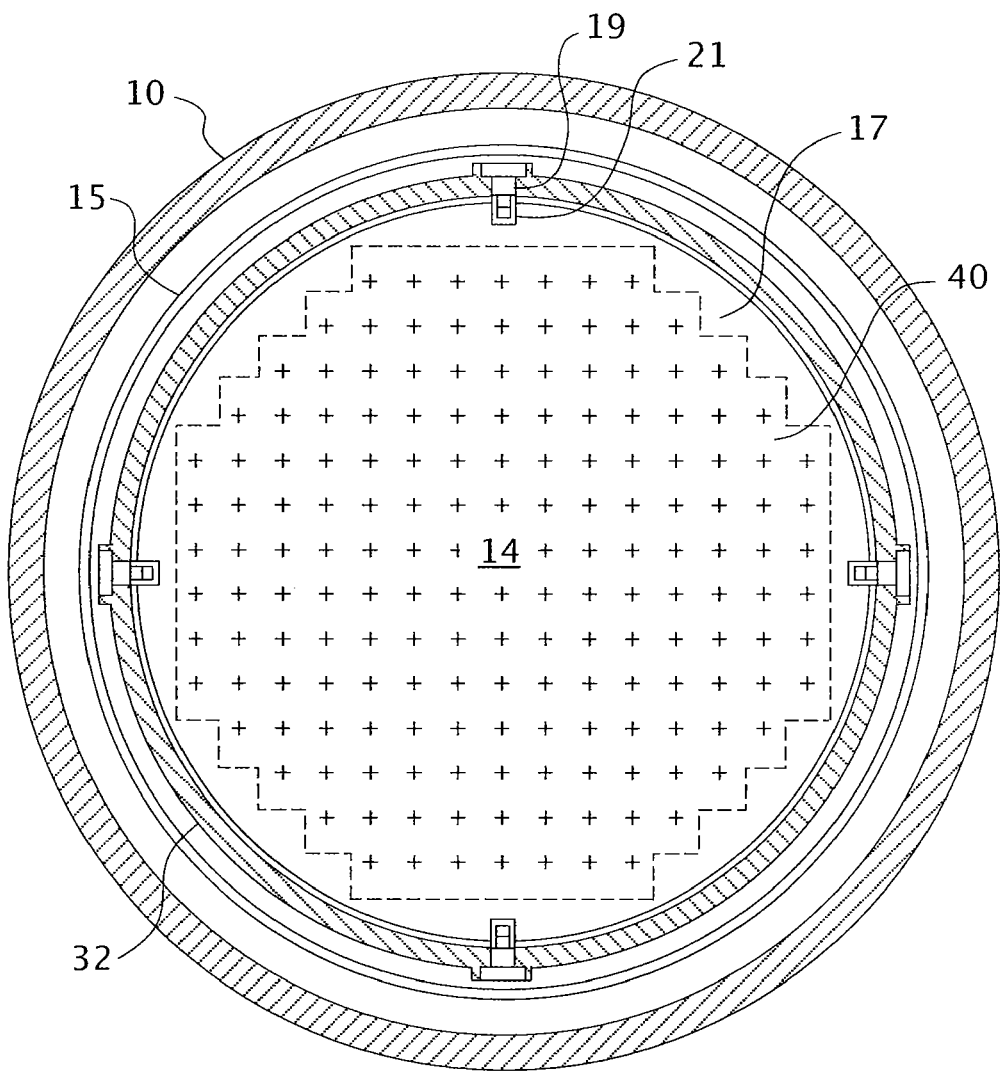
FIG. 1 is a cross-sectional view of a nuclear reactor vessel showing the pressure vessel, thermal shield, core barrel, core shroud and the core fuel assemblies.
Figure 2:
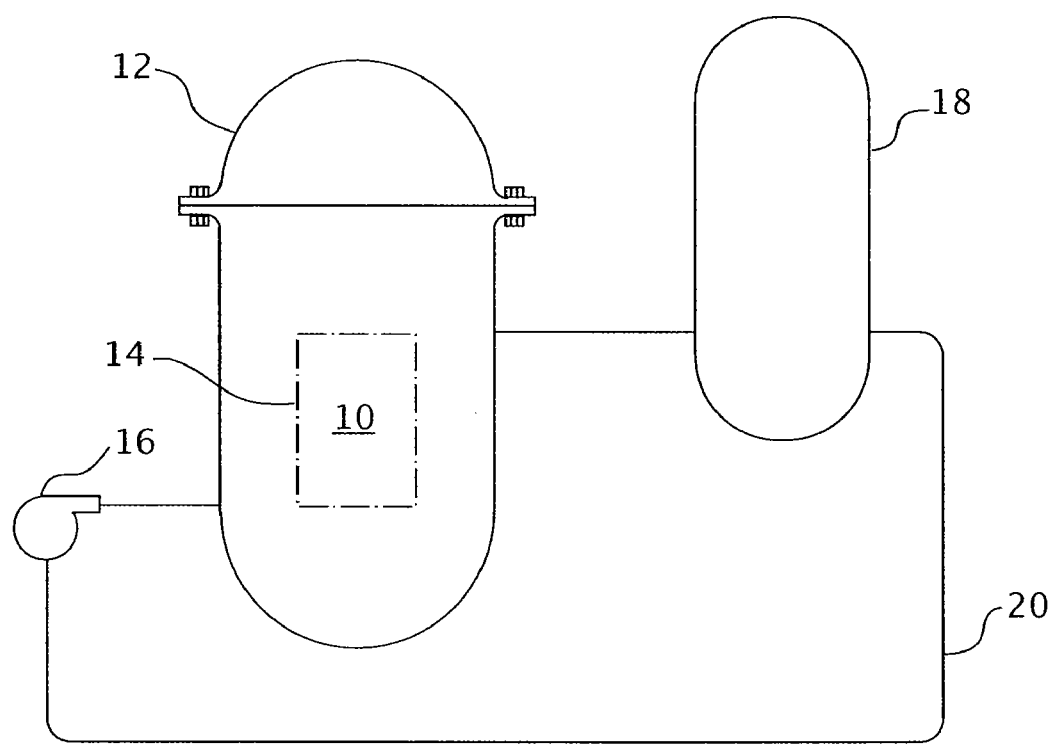
FIG. 2 is a simplified schematic of a nuclear reactor system to which this invention may be applied.

Referring now to the drawings, FIG. 2 shows a simplified nuclear reactor primary system, including a generally cylindrical reactor pressure vessel (10) having a closure head (12) enclosing a nuclear core (14). A liquid reactor coolant, such as water, is pumped into the vessel (10) by pumps (16) through the core (14) where heat energy is absorbed and is discharged to a heat exchanger (18), typically referred to as a steam generator, in which heat is transferred to a utilization circuit (not shown), such as a steam-driven turbine generator. The reactor coolant is then returned to the pump (16), completing the primary loop. Typically, a plurality of the above-described loops are connected to a single reactor vessel (10) by reactor coolant piping (20).

Figure 3:
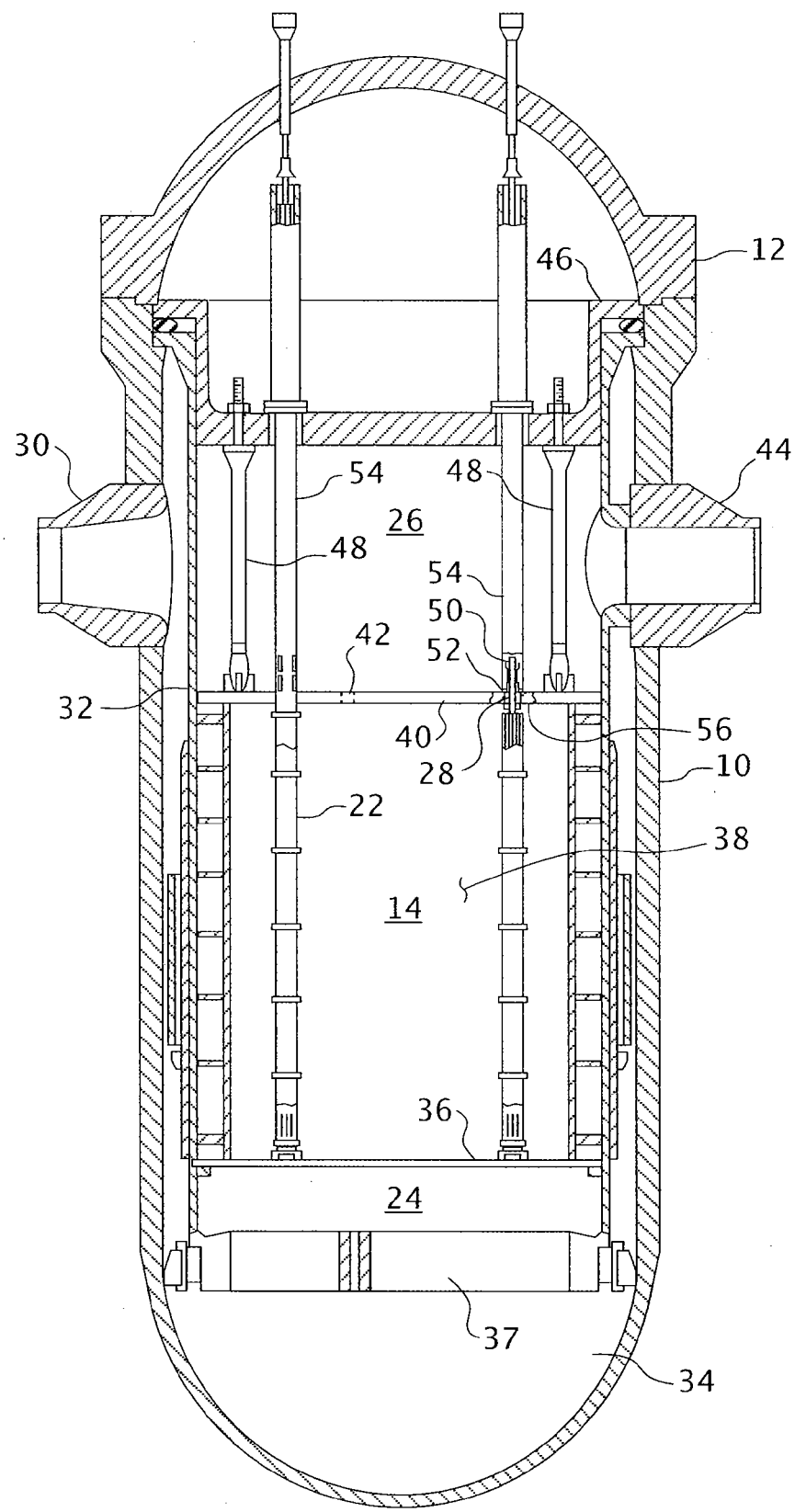
FIG. 3 is an elevational view, partially in section, of a nuclear reactor vessel and internal components to which this invention may be applied.

An exemplary reactor design is shown in more detail in FIG. 3. In addition to a core (14) comprised of a plurality of parallel, vertical co-extending fuel assemblies (22), for purposes of this description, the other vessel internal structures can be divided into the lower internals (24) and the upper internals (26). In conventional designs, the lower internals function is to support, align and guide core components and instrumentation, as well as direct flow within the vessel. The upper internals restrain or provide a secondary restraint for the fuel assemblies (22) (only two of which are shown for simplicity), and support and guide instrumentation and components, such as control rods (28).

In the exemplary reactor shown in FIG. 3, coolant enters the vessel (10) through one or more inlet nozzles (30), flows downward through an annulus between the vessel and the core barrel (32), is turned 180° in a lower plenum (34), passes upwardly through a lower support plate (37) and a lower core plate (36) upon which the fuel assemblies (22) are seated and through and about the assemblies. In some designs the lower support plate (37) and lower core plate (36) are replaced by a single structure, the lower core support plate, at the same location as (37). The coolant flow through the core and surrounding area (38) is typically large, on the order of 400,000 gallons per minute at a velocity of approximately 20 feet per second. The resulting pressure drop and frictional forces tends to cause the fuel assemblies to rise, which movement is restrained by the upper internals, including a circular upper core plate (40). Coolant exiting the core (14) flows along the underside of the upper core plate and upwardly through a plurality of perforations (42). The coolant then flows upwardly and radially to one or more outlet nozzles (44).

The upper internals (26) can be supported from the vessel or the vessel head and include an upper support assembly (46). Loads are transmitted between the upper support assembly (46) and the upper core plate (40), primarily by a plurality of support columns (48). A support column is aligned above a selected fuel assembly (22) and perforations (42) in the upper core plate (40).

Rectilinearly moveable control rods (28) typically include a drive shaft (50) and a spider assembly (52) of neutron poison rods that are guided through the upper internals (26) and into aligned fuel assemblies (22) by control rod guide tubes (54). The guide tubes are fixedly joined to the upper support assembly (46) and connected by a split pin (56) force fit into the top of the upper core plate (40). The pin configuration provides for ease of guide tube assembly and replacement if ever necessary and assures that core loads, particularly under seismic or other high loading accident conditions are taken primarily by the support columns (48) and not the guide tubes (54). This assists in retarding guide tube deformation under accident conditions which could detrimentally affect control rod insertion capability.

Figure 6:
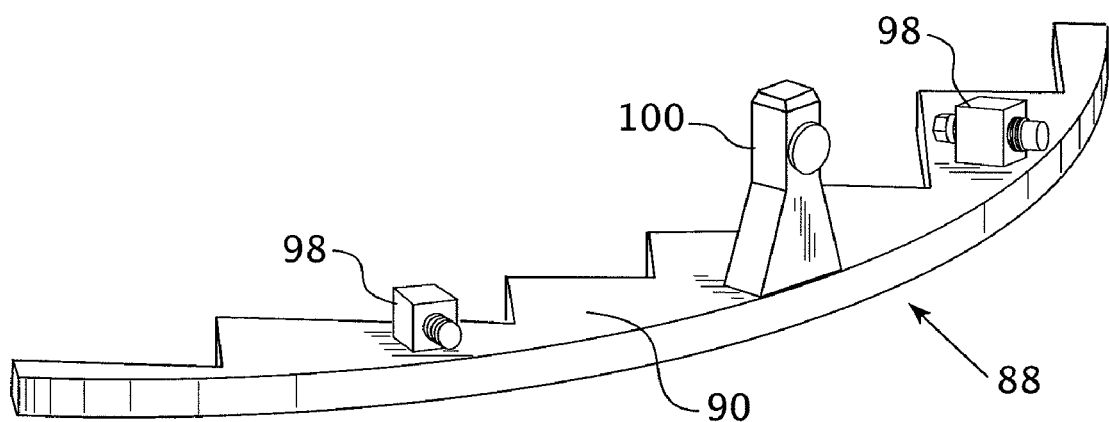
FIG. 6 is a perspective view of a jacking block assembly and alignment post installed on a core shroud top plate with the core shroud vertical plates that extend down from the core shroud top plate removed for simplicity.

Though not shown in FIG. 3, the design of this invention includes a core shroud positioned inside the circular core barrel (32) that converts the inner profile of the core barrel to a stepped circumferential profile that matches the peripheral outline of the fuel assemblies (22) within the core. A portion of the shroud's stepped inner circumferential profile can be observed in FIG. 6, which provides a perspective view of a portion of the top plate (90) of the core shroud assembly (88), with the alignment features of this invention. The vertical shroud panels that extend down from each of the stepped profiles on the inner periphery of the core shroud top plate (90), to surround the core, are not shown for simplicity. The core shroud top plate (90) is shown in FIG. 6 with two jacking block assemblies (98) circumferentially spaced on either side of an alignment post (100). The jacking block assemblies (98) are circumferentially positioned at the periphery of the core shroud top plate (90). There are anywhere from approximately eight to sixteen jacking block assemblies equally spaced around the circumference of the periphery of the core shroud top plate (90). The jacking block assemblies (98) are used to center the core shroud assembly (88) within the core barrel (32). The alignment post (100) of which there are preferably four equally spaced around the circumference of the periphery of the core shroud top plate (90) are used to align the upper core plate (40) with the core shroud assembly (88).

Figure 4A:
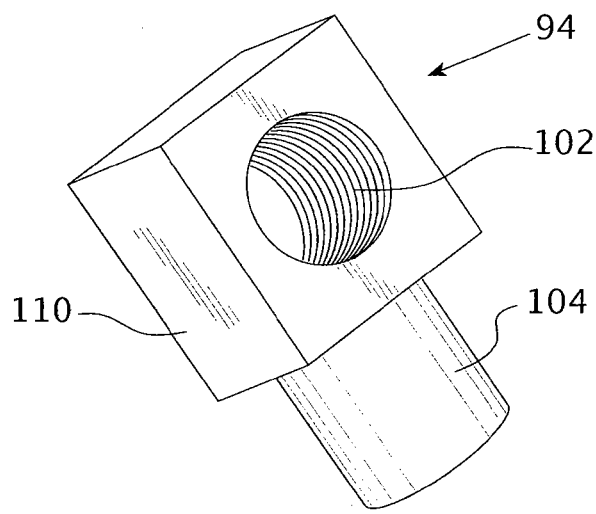
FIG. 4a is a perspective view of a core shroud jacking block of this invention.
Figure 4B:
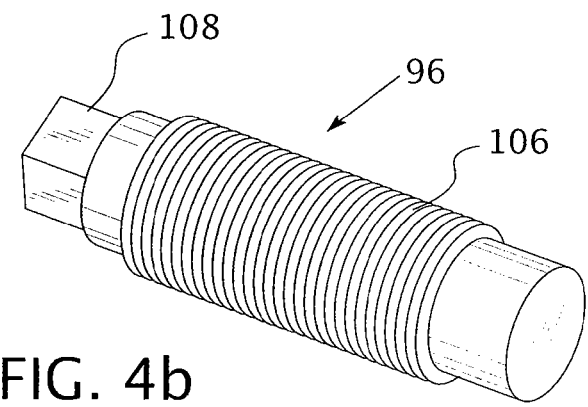
FIG. 4b is a perspective view of a core shroud jacking stud of this invention.
Figure 4C:
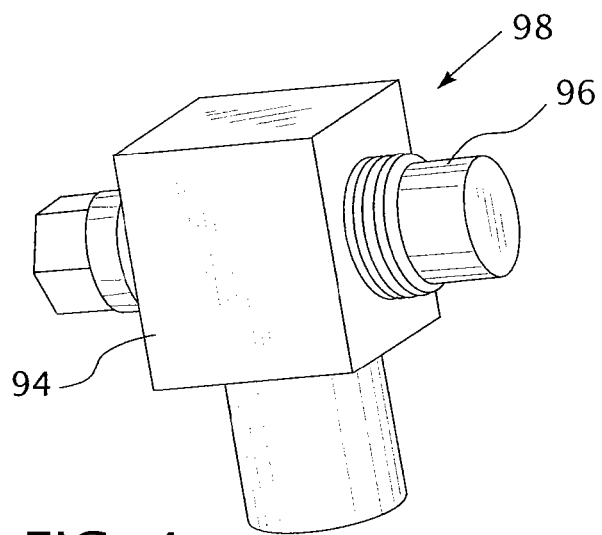
FIG. 4c is a perspective view of a core shroud jacking block assembly with a jacking stud shown threaded inside the jacking block.

Accordingly, the alignment system of this invention basically consists of three main components: (i) jacking blocks (94); (ii) jacking studs (96); and (iii) alignment posts (100). When assembled together, the jacking block (94) and the jacking stud (96) form a jacking block assembly (98) which can be better observed from the perspective view shown in FIG. 4c. The jacking block alone is shown in FIG. 4a and is constructed from a metal block (110), such as stainless steel with a threaded hole (102) centered through it. A stem (104) extends below the block (110) and is closely received within a hole in the core shroud top plate (90) and secured therein by a full penetration weld. The jacking stud (96) is shown in FIG. 4b and has a circumferential thread (106) that mates with the thread in the threaded hole (102) in the jacking block (94). The jacking stud (96) has an articulated rear end (108) which mates with a complimentary recess in an installation tool that can be used to turn the jacking stud (96) within the threaded hole (102) in the jacking block assembly (98).

Figure 7:
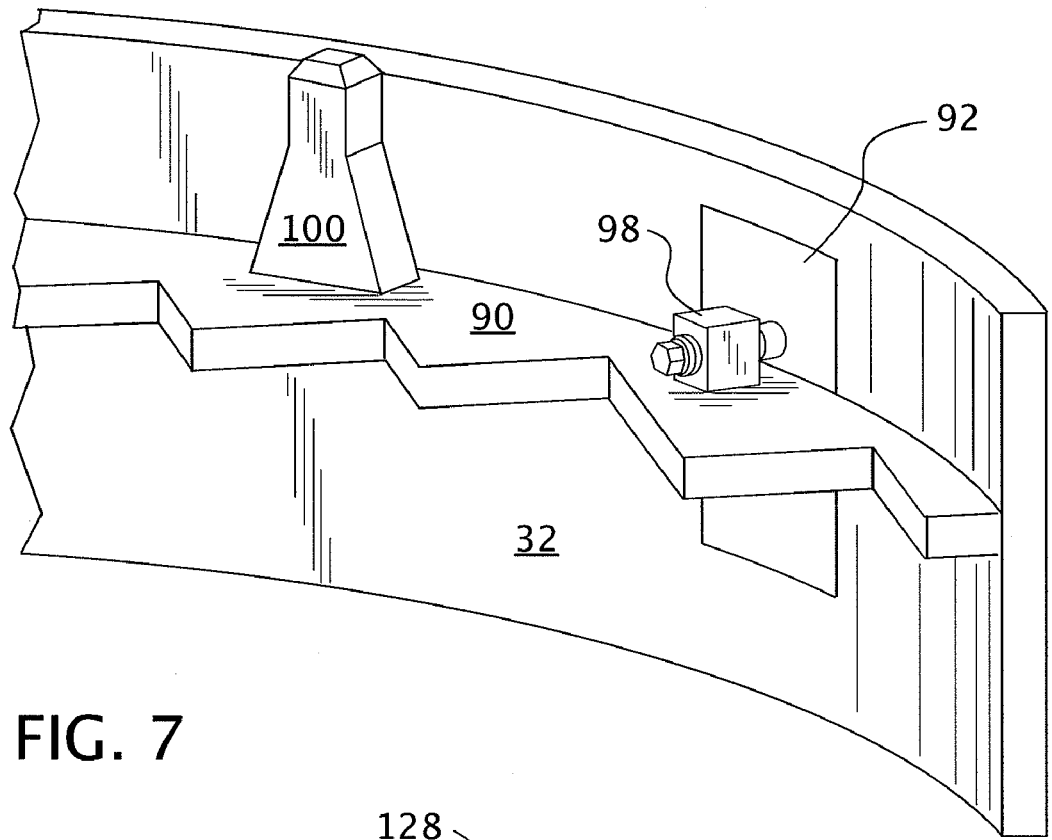
FIG. 7 is a perspective view of a portion of the core shroud top plate shown inside a portion of the core barrel and illustrates a jacking block assembly aligning the core shroud top plate within the core barrel.

As previously stated the main purpose of the jacking block assemblies (98) is to center, or align the core shroud assembly (88) within the core barrel (32) during final assembly at manufacturing. Alignment is made by adjusting the threaded jacking studs (96). After final positioning, the threads (106) of the jacking stud (96) are "staked" or "spot" welded to the jacking block (94). During reactor operation, the loads at the top of the core shroud assembly (88) would be carried radially via the jacking studs (96) to the core barrel (32). As can be seen in FIG. 7, preferably a hard surface (92) such as stellite is affixed to the inside surface of the core barrel (32), such as by welding, in the area that abuts the radially outward end of the jacking stud (96). The size of the hard surface (92) that interfaces with the jacking stud (96) should be large enough to accommodate the differential thermal expansion of the core shroud assembly (88) and the core barrel (32) as shown in FIG. 7, so that the abutting end of the jacking stud (96) remains in contact with the hard surface (92) through all phases of reactor operation.

Figure 5:
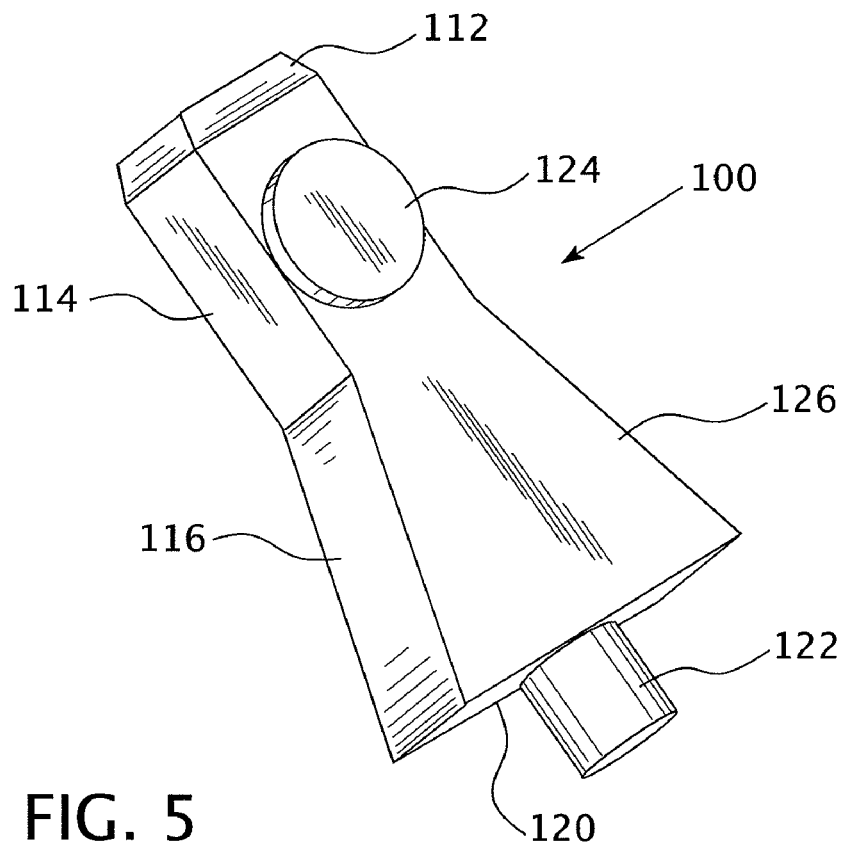
FIG. 5 is a perspective view of an alignment post of this invention.
Figure 8A:
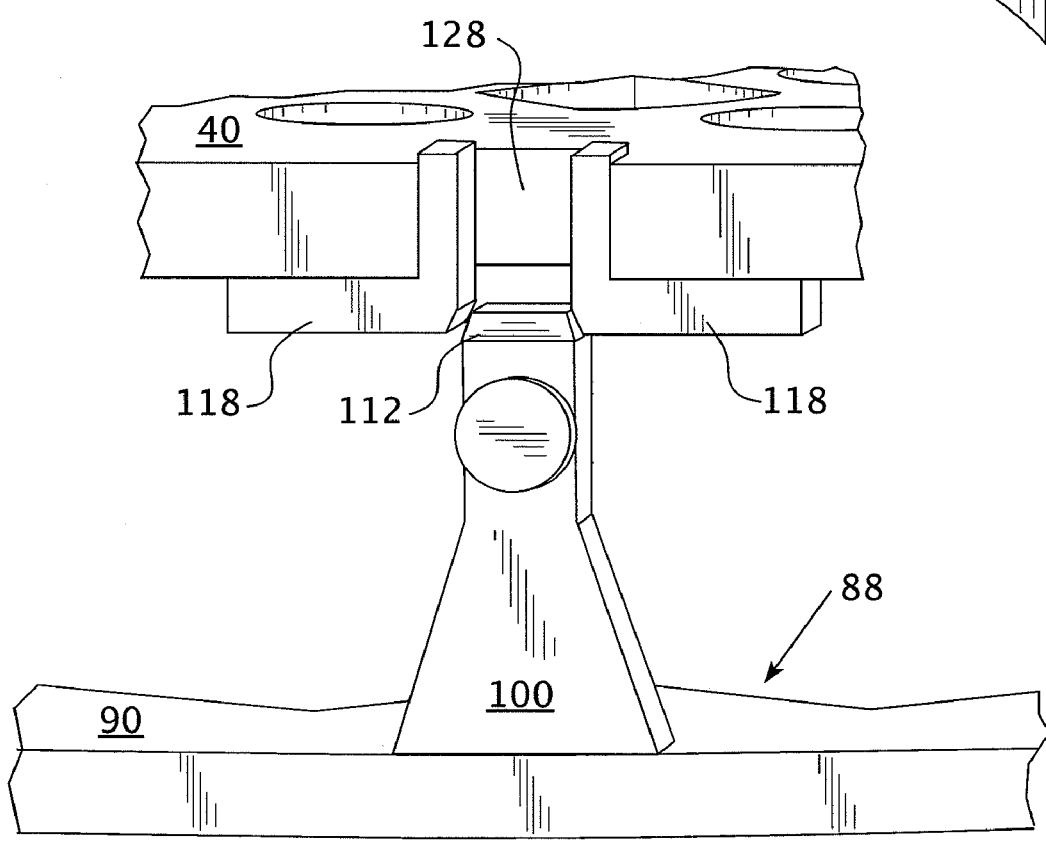
FIG. 8a is a perspective view illustrating the engagement of the upper internals upper core plate notch with an alignment post.
Figure 8B:
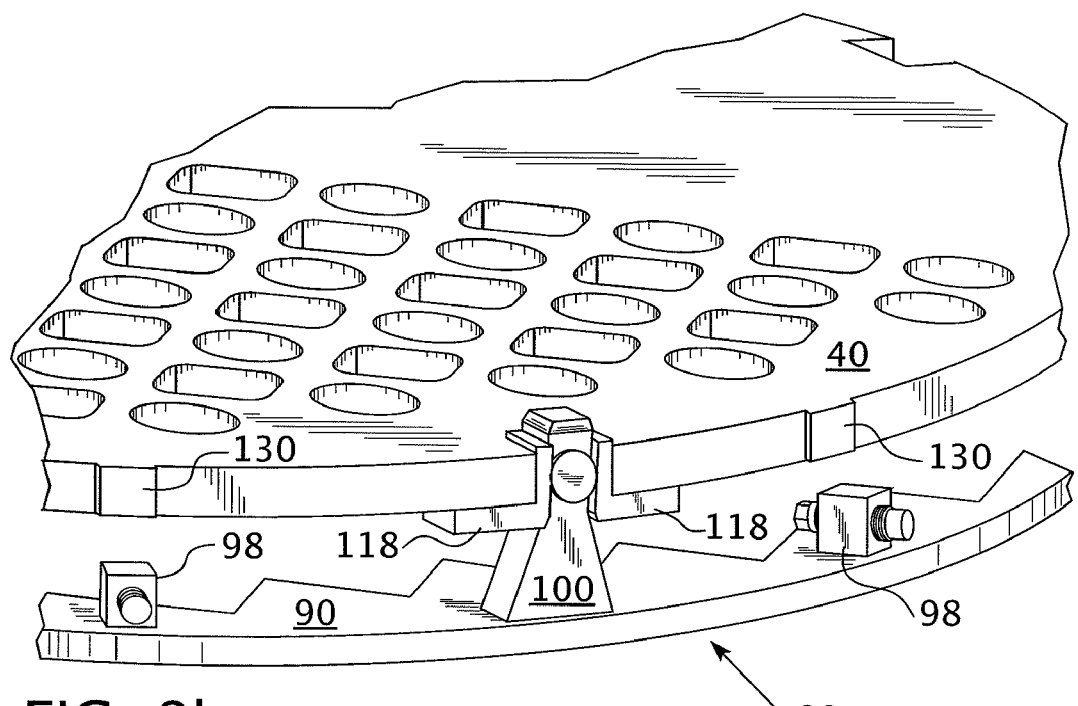
FIG. 8b is a perspective view of the upper core plate fully engaged with the lower internals core shroud top plate.

The alignment post (100) is best shown in FIG. 5. The alignment post (100) has a chamfered upper end (112) that tapers outwardly to a vertical side wall (114) that extends approximately halfway down the alignment post. The vertical wall (114) at an end opposite the chamfer (112) has a lower section (116) that extends outward to form an acute angle with the base (120). Similar to the jacking block assemblies (98) the alignment post (100) has a welding stem (122) that extends from the base (120) and is received in a corresponding opening in the top plate (90) of the core shroud assembly (88) where it is secured by a full penetration weld. A bumper (124) extends from the radial outward face (126) of the alignment post (100) as will be explained in greater detail hereafter. During installation of the upper internals within the lower internals, the chamfered (lead-in) surfaces (112) on the alignment post (100) will assure proper alignment of the upper core plate (40) inserts (118) prior to engagement of the upper core plate (40) fuel guide pins with the fuel assembly top nozzles as can be seen from FIG. 8a. Though the alignment post (100) is shown as being received within a slot (128) in the upper core plate (40), it should be appreciated that the alignment post (100) can also be situated radially inward from the edge of the core shroud top plate (90) and be received within a hole in the upper core plate (40) instead of the slot (128) without departing from the intent of this invention. The final installed configuration of the upper core plate (40) with the lower internals is illustrated in FIG. 8b.

Figure 9:
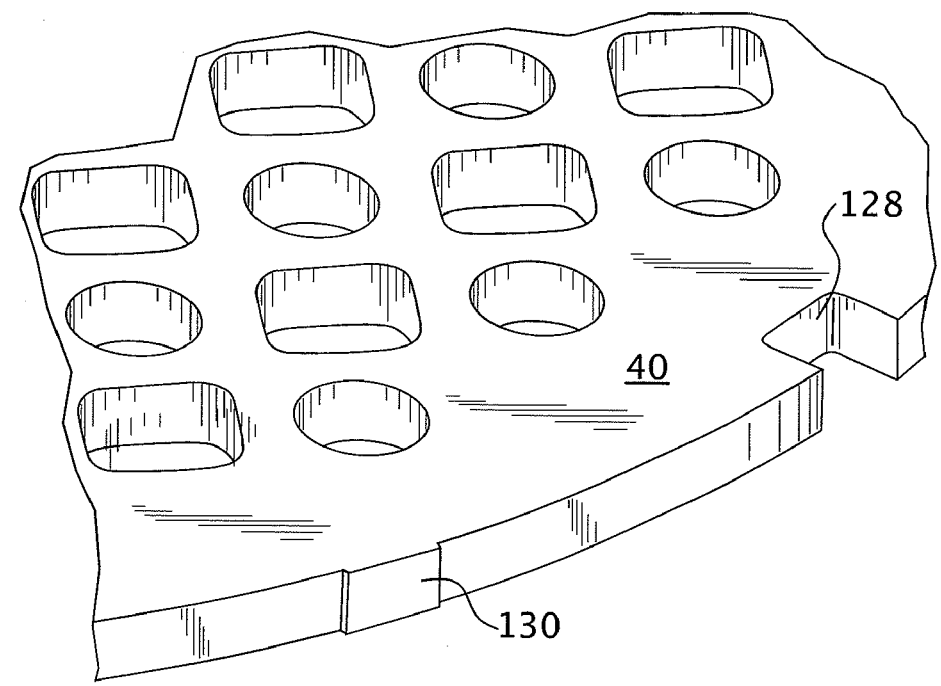
FIG. 9 is a perspective view of a peripheral section of the upper core plate showing a radial bumper on a portion of the upper core plate's circumference.

FIG. 9 shows a guide or bumper (130) that radially extends from the edge of the upper core plate (40) to provide additional guidance for the upper core plate (40) as it is lowered within the lower internals core barrel (32) during installation. The radial thickness of this bumper (130) may be also customized so that the in-plane loading of the upper core plate during reactor operation can be transferred as a radial load to the core barrel (32). As noted with regard to FIG. 5, the alignment post (100) is designed with a bumper (124). The purpose of the bumper (124) is to provide a shared load path for in-plane upper core plate loads. The thickness (i.e., the radial extent) of the bumper (124) would also be determined from "as built" measurements of the mating hardware. If necessary, the upper core plate (40) could also be designed to include an additional insert (119) on the backside of the slots (128) as illustrated in FIG. 11.

Figure 13:
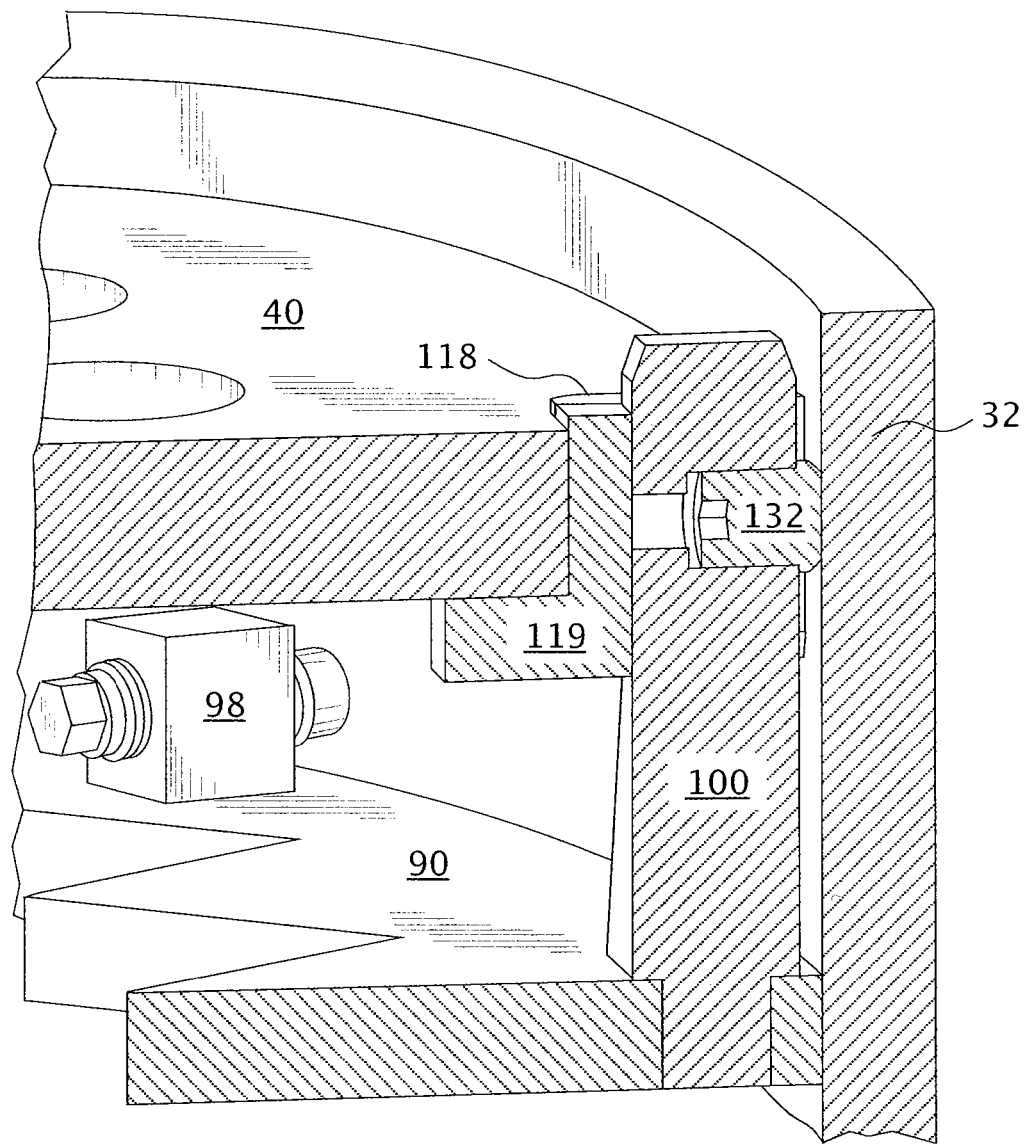
FIG. 13 is a cross-sectional view of an upper core plate, alignment post and shroud top plate assembly showing a cross-section of the jacking stud mounted in the alignment post in juxtaposition to the core barrel.
Figure 14:
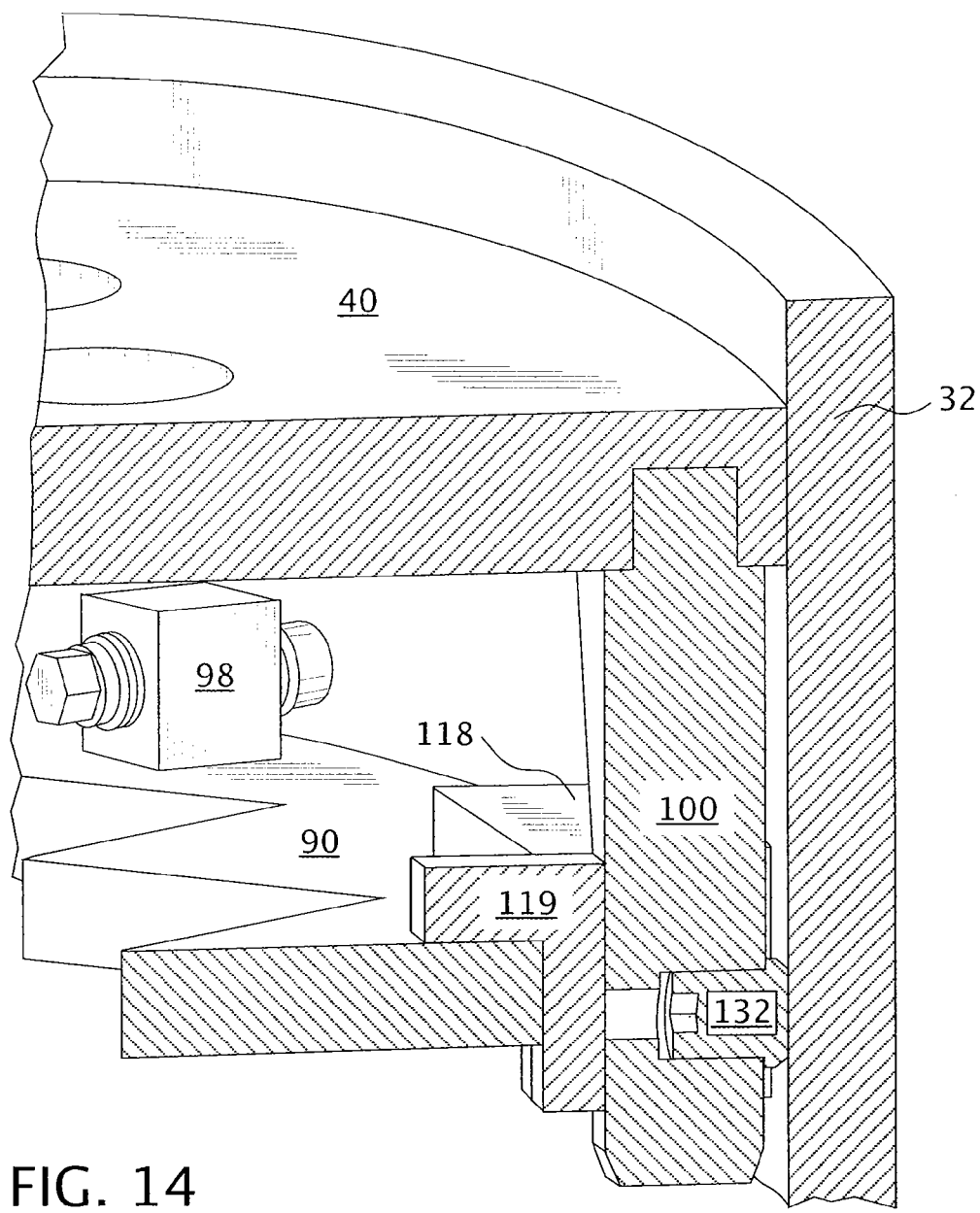
FIG. 14 is a cross-sectional view of an upper core plate, alignment post and top shroud plate assembly of FIG. 13, showing an alternated arrangement in which the alignment post is affixed to the upper core plate and extends downward through a slot in the shroud top plate.

An alternate design for the bumper (124) on the alignment post (100) is shown in FIGS. 11 and 12. FIG. 11 shows two perspectives of the alignment post jacking stud (132) to provide views of the front (134) and rear (136) of the jacking stud (132). The front end (134) of the stud (132) is rounded to engage the core barrel (32) on its inner circumference while the back end (136) of the stud (132) has a machined recess (138) that engages a complimentary shaped tool to facilitate turning the stud during installation. The outside circumference of the stud (132) is threaded to engage into mating threads in a recess (140) in the radial outward face (126) of the alignment post (100) as shown in FIG. 12. After installation of the core shroud assembly (88), the jacking studs (132) on the alignment post (100) can be adjusted to achieve the desired gap with the core barrel. A hole (142) is provided in the backside of the alignment post (100) for a tool to engage the jacking stud (132) for adjustment. FIG. 13 shows a cross-sectional view of the core shroud top plate (90) and upper core plate (40) taken along a vertical plane that dissects an alignment post (100) and shows a jacking stud (132) in Juxtaposition to the core barrel (32). The front face (134) of the jacking studs (132) on the alignment post (100) and the radial outward face of the jacking studs (96) on the jacking block assemblies (98) both abut a hardened surface (92) such as stellite, on the core barrel (32). As previously mentioned, the hard surface (92) should be large enough to accommodate the differential thermal expansion between the core shroud assembly (88) and the core barrel (32). FIG. 14 shows an alternate configuration in which the alignment post (100) is affixed to the underside of the upper core plate (40) by, for example a full penetration weld, and the lower portion of the alignment post (100) extends downward through a slot in the core shroud top plate (90). In all other respects the configuration shown in FIG. 14 is the same as that shown in FIG. 13.

Accordingly, the alignment system of this invention requires few parts, requires relatively easy assembly and does not require machining of the core barrel to accommodate final installation of the core shroud assembly. Furthermore, the alignment system of this invention facilitates easy removal of the core shroud should there ever be a future need.

The welding of the jacking blocks (94) and the alignment posts (100) to the core shroud top plate (90) is completed during core shroud assembly, not after the core shroud assembly is installed in the lower internals core barrel (32). Therefore, a significant savings in manufacturing process time will be realized since final positioning of the core shroud top plate (90) would be made by adjusting the jacking studs (96) as compared to the process of installing alignment plates described in the Background of the Invention Section hereof. Furthermore, should there be a need to remove the core shroud subsequent to reactor operation, the time required to loosen the studs in the core shroud jacking block assemblies (98) would be negligible when compared to that which would be required for the removal of the alignment plates described in the a foresighted application.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalence thereof.

What is claimed is:

1. A nuclear reactor lower internals shroud comprising:
   a top plate with a central axis and a peripheral end circumscribing the top plate;
   a plurality of jacking blocks attached to a top surface of the top plate spaced around and proximate the peripheral end, each jacking block having a threaded recess facing the peripheral end of the top plate and extending radially inward toward the central axis;
   a jacking screw for at least some of the jacking blocks, each jacking screw having a peripheral thread sized to mate with and be screwed within the threaded recess, with a distal end of the jacking screw extending radially outward over the peripheral end; and
   a plurality of alignment posts attached to the top plate, spaced around and proximate the peripheral end and extending upwardly from the top plate, wherein at least some of the alignment posts are threadedly engaged with a bumper having a distal end extending radially outward over the peripheral end.

2. The nuclear reactor lower internals shroud of claim 1 wherein the distal end of the bumper is at least partially rounded.

3. The nuclear reactor lower internals shroud of claim 1 wherein an end of the bumper opposite the distal end is accessed for adjustment through an opening on the radially inward side of the alignment post.

4. The nuclear reactor lower internals shroud of claim 1 wherein the threaded recess extends radially completely through the jacking block.

5. The nuclear reactor lower internals shroud of claim 1 wherein an upper end of the alignment posts is chamfered.

6. The nuclear reactor lower internals shroud of claim 1 wherein at least some of the alignment posts have a front end facing the peripheral end, a rear end facing the central axis and two sides, wherein the sides extend upwardly at an acute angle to the upper surface of the top plate from the upper surface of the top plate to a height at least partially up the alignment post.

7. The nuclear reactor lower internals shroud of claim 1 wherein the alignment posts are circumferentially spaced from the jacking blocks.

8. A nuclear reactor comprising:
a pressure vessel;
an annular core barrel seated within and supported by the pressure vessel;
a core shroud supported within the core barrel, the core shroud comprising;
    a top plate with a central axis and a peripheral edge circumscribing the top plate;
    a plurality of jacking blocks attached to a top surface of the top plate spaced around and proximate the peripheral edge, each jacking block having a threaded recess facing the peripheral end of the top plate and extending radially inward toward the central axis;
    a jacking screw for at least some of the jacking blocks, each jacking screw having a peripheral thread sized to mate with and be screwed within the threaded recess, with a distal end of the jacking screw extending radially outward over the peripheral edge;
an upper core plate having a peripheral edge that circumscribes the upper core plate;
a plurality of alignment posts attached to a one of the top plate or the upper core plate, spaced around and proximate the peripheral edge and extending toward another of the top plate and the upper core plate wherein at least some of the alignment posts are threadedly engaged with a bumper having a distal end extending radially outward over the peripheral end; and
a plurality of peripheral passageways in the other of the top plate or upper core plate, in or adjacent the peripheral edge, that align with the alignment posts on the one of the top plate or the upper core plate, the alignment posts being at least partially received within the peripheral passageways when the upper core plate is properly aligned in position within the pressure vessel.

9. The nuclear reactor of claim 8 wherein the distal end of the bumper is at least partially rounded.

10. The nuclear reactor of claim 8 wherein an end of the bumper opposite the distal end is accessed for adjustment through an opening on the radially inward side of the alignment post.

11. The nuclear reactor of claim 8 wherein the threaded recess extends radially completely through the jacking block.

12. The nuclear reactor of claim 8 wherein a distal end of at least some of the alignment posts is chamfered.

13. The nuclear reactor of claim 8 wherein at least some of the alignment posts have a front end facing the peripheral edge, a rear end facing the central axis and two sides, wherein the sides extend towards a distal end at an acute angle to a surface of the one of the top plate or the upper core plate from the surface to a length along the sides at least partially toward the distal end.

14. The nuclear reactor of claim 8 wherein the alignment posts are circumferentially spaced from the jacking blocks.

15. The nuclear reactor of claim 8 including inserts within the peripheral passageways to closely conform a contour of the peripheral passageways to an interfacing contour on the alignment posts.

16. The nuclear reactor of claim 15 wherein a receiving edge of the inserts is chamfered.

17. The nuclear reactor of claim 8 including a plurality of raised lands extending radially outward from the peripheral edge of the upper core plate, the raised lands being spaced around the peripheral edge and extending circumferentially for a distance that is significantly shorter than the circumferential distance between the raised lands.

* * * * *